(12) United States Patent
Feng et al.

(10) Patent No.: US 9,825,758 B2
(45) Date of Patent: Nov. 21, 2017

(54) SECURE COMPUTER EVALUATION OF K-NEAREST NEIGHBOR MODELS

(71) Applicant: Microsoft Technology Licensing, LLC, Redmond, WA (US)

(72) Inventors: Tony Feng, Avon, CT (US); David J. Wu, Stanford, CA (US); Michael Naehrig, Sammamish, WA (US); Kristin Lauter, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/558,652

(22) Filed: Dec. 2, 2014

(65) Prior Publication Data

US 2016/0156460 A1 Jun. 2, 2016

(51) Int. Cl.
*H04L 9/00* (2006.01)
*H04L 9/30* (2006.01)
*G06N 5/02* (2006.01)

(52) U.S. Cl.
CPC ............. *H04L 9/008* (2013.01); *H04L 9/30* (2013.01); *G06N 5/02* (2013.01); *H04L 2209/24* (2013.01)

(58) Field of Classification Search
CPC ....... H04L 9/008; H04L 9/30; H04L 2209/24; G06N 5/02
See application file for complete search history.

(56) References Cited

U.S. PATENT DOCUMENTS

| | | | |
|---|---|---|---|
| 6,834,272 B1 | 12/2004 | Naor et al. | |
| 7,472,105 B2 | 12/2008 | Staddon et al. | |
| 7,685,115 B2 | 3/2010 | Avidan et al. | |
| 7,743,253 B2 * | 6/2010 | Lauter ............... | H04L 9/008 713/170 |
| 8,229,939 B2 | 7/2012 | Staddon et al. | |
| 8,271,796 B2 | 9/2012 | Diamond | |

(Continued)

FOREIGN PATENT DOCUMENTS

| | | |
|---|---|---|
| EP | 2485428 A2 | 8/2012 |
| EP | 2874341 A1 | 5/2015 |

(Continued)

OTHER PUBLICATIONS

Elmehdwi et al., "Secure k-nearest neighbor query over encrypted data in outsourced environments", Mar. 2014, IEEE, 2014 IEEE International Conference on Data Engineering, p. 664-675.*

(Continued)

*Primary Examiner* — Beemnet Dada
*Assistant Examiner* — Stephen Gundry
(74) *Attorney, Agent, or Firm* — Patent GC LLC (57) ABSTRACT

A user device and one or more server computers securely evaluate a k-nearest neighbor model, with reasonable computation speed and bandwidth utilization, using a combination of techniques. The user device encrypts input vectors using a client's public key to keep client information private. The server computer homomorphically computes a distance between the encrypted input vector and vectors stored in the k-nearest neighbor model. The server computer then engages in a minimization process which results in the user device receiving classification vectors corresponding to the k-nearest neighbors.

20 Claims, 8 Drawing Sheets

(56) References Cited

U.S. PATENT DOCUMENTS

| | | | |
|---|---|---|---|
| 8,370,621 B2* | 2/2013 | Raykova | H04L 9/008 380/255 |
| 8,478,768 B1* | 7/2013 | Pathak | G06Q 30/0282 707/754 |
| 8,515,058 B1 | 8/2013 | Gentry | |
| 8,539,220 B2 | 9/2013 | Raykova et al. | |
| 8,756,410 B2 | 6/2014 | Raykova et al. | |
| 8,903,090 B2 | 12/2014 | Bikel | |
| 8,942,431 B2* | 1/2015 | Forero | G06K 9/00335 382/115 |
| 9,002,007 B2 | 4/2015 | Nabeel et al. | |
| 9,009,089 B1* | 4/2015 | El Defrawy | G06F 21/602 706/18 |
| 9,037,860 B1 | 5/2015 | Kerschbaum | |
| 9,055,038 B1* | 6/2015 | Lu | H04L 63/0428 |
| 9,195,939 B1 | 11/2015 | Goyal et al. | |
| 9,208,438 B2 | 12/2015 | Goyal et al. | |
| 9,275,334 B2 | 3/2016 | Sharma | |
| 9,306,738 B2* | 4/2016 | Loftus | H04L 9/008 |
| 9,390,271 B2* | 7/2016 | Saldamli | H04L 9/008 |
| 9,535,658 B2 | 1/2017 | Kolesnikov | |
| 2005/0201555 A1 | 9/2005 | Yen et al. | |
| 2006/0085651 A1 | 4/2006 | Staddon et al. | |
| 2007/0116283 A1* | 5/2007 | Tuyls | H04L 9/008 380/255 |
| 2007/0118746 A1* | 5/2007 | Lauter | H04L 9/008 713/170 |
| 2009/0119518 A1 | 5/2009 | Staddon et al. | |
| 2009/0268908 A1* | 10/2009 | Bikel | H04L 9/30 380/255 |
| 2010/0306543 A1 | 12/2010 | Kolesnikov | |
| 2011/0191586 A1* | 8/2011 | Jung | H04L 9/32 713/168 |
| 2011/0211692 A1 | 9/2011 | Raykova et al. | |
| 2012/0002811 A1* | 1/2012 | Smart | H04L 9/085 380/255 |
| 2012/0144185 A1* | 6/2012 | Raykova | H04L 9/008 713/150 |
| 2012/0151205 A1* | 6/2012 | Raykova | H04L 9/085 713/150 |
| 2012/0201378 A1* | 8/2012 | Nabeel | H04L 9/008 380/255 |
| 2012/0227105 A1* | 9/2012 | Friedrichs | H04L 63/1416 726/22 |
| 2012/0233460 A1 | 9/2012 | Kamara et al. | |
| 2013/0114811 A1 | 5/2013 | Boufounos et al. | |
| 2013/0173917 A1* | 7/2013 | Clifton | G06F 21/6227 713/167 |
| 2013/0185239 A1 | 7/2013 | Dedeoglu | |
| 2013/0204905 A1* | 8/2013 | Ioffe | H04L 9/3236 707/803 |
| 2013/0216044 A1* | 8/2013 | Gentry | H04L 9/08 380/277 |
| 2013/0236112 A1* | 9/2013 | Oka | H03M 7/3062 382/232 |
| 2013/0254532 A1 | 9/2013 | Raykova | |
| 2013/0268469 A1 | 10/2013 | Sharma et al. | |
| 2013/0339751 A1* | 12/2013 | Sun | H04L 9/008 713/189 |
| 2013/0343616 A1* | 12/2013 | Forero | G06K 9/00335 382/115 |
| 2014/0040614 A1 | 2/2014 | Kolesnikov et al. | |
| 2014/0041039 A1* | 2/2014 | Saldamli | H04L 9/008 726/26 |
| 2014/0089908 A1 | 3/2014 | Dunn et al. | |
| 2014/0108435 A1 | 4/2014 | Kolesnikov et al. | |
| 2014/0121990 A1 | 5/2014 | Baldi et al. | |
| 2014/0177828 A1* | 6/2014 | Loftus | H04L 9/008 380/44 |
| 2014/0298018 A1* | 10/2014 | Haggerty | H04W 4/003 713/168 |
| 2014/0372769 A1* | 12/2014 | Kerschbaum | H04L 9/008 713/189 |
| 2015/0089243 A1* | 3/2015 | Veugen | G06F 21/72 713/190 |
| 2015/0149773 A1 | 5/2015 | Kerschbaum et al. | |
| 2015/0341326 A1 | 11/2015 | Premnath | |
| 2015/0349949 A1* | 12/2015 | Boufounos | H04W 12/08 380/270 |
| 2015/0381349 A1* | 12/2015 | Nikolaenko | H04L 9/008 713/189 |
| 2016/0004874 A1* | 1/2016 | Ioannidis | H04L 9/008 713/165 |
| 2016/0020898 A1 | 1/2016 | Nikolaenko | |
| 2016/0036584 A1 | 2/2016 | Nikolaenko | |
| 2016/0044003 A1 | 2/2016 | Raykova | |
| 2016/0119119 A1* | 4/2016 | Calapodescu | H04L 9/008 380/30 |
| 2016/0156460 A1* | 6/2016 | Feng | H04L 9/30 713/168 |
| 2016/0182222 A1* | 6/2016 | Rane | H04L 9/008 713/168 |
| 2016/0191233 A1* | 6/2016 | Loftus | H04L 9/008 713/189 |

FOREIGN PATENT DOCUMENTS

| | | |
|---|---|---|
| WO | 2008135951 A1 | 11/2008 |
| WO | 2014137392 A1 | 12/2013 |

OTHER PUBLICATIONS

Mell et al., "The NIST Definition of Cloud Computing", 2011, NIST, p. 1-7.*

Kolesnikov, et al., "How to Combine Homomorphic Encryption and Garbled Circuits", In Proceedings of Signal Processing in the Encrypted Domain-First SPEED Workshop—Lousanne, Sep. 10, 2009, pp. 100-121.

Lauter, et al., "Private Computation on Encrypted Genomic Data", In Techinical Report—MSR-TR-2014-93, Jun. 2014, 21 pages.

Amirbekyan, et al., "The Privacy of k-NN retrieval for Horizontal Partitioned Data—New Methods and Applications", IIn Proceedings of the Eighteenth Australasian Database Conference, Jan. 29, 2007, 6 pages.

Zheng, et al., "An efficient Image Homomorphic Encryption Scheme with Small Ciphertext Expansion", In Proceedings of the 21st ACM international conference on Multimedia, Oct. 21, 2013, pp. 803-812.

Sahni et al., "To Maintain Privacy Using Add Multiply and K-Mediod", In International Journal of Recent Development in Engineering and Technology, vol. 2, Issue 4, Apr. 2014, pp. 50-54.

Rane, et al., "Privacy-Preserving Nearest Neighbor Methods", Retrieved on: Oct. 10, 2014 Available at: http://boufounos.com/Publications/RB_SPM13_PPNN.pdf.

López-Alt, et al., "On-the-Fly Multiparty Computation on the Cloud via Multikey Fully Homomorphic Encryption", In Proceedings of the forty-fourth annual ACM symposium on Theory of computing, May 19, 2012, pp. 1219-1234.

Thoma, et al., "Secure Multiparty Computation Based Privacy Preserving Smart Metering System", In Proceedings of North American Power Symposium, Sep. 9, 2012, 6 pages.

Zhan, et al., "Privacy Preserving K-nearest Neighbor Classification", In International Journal of Network Security, vol. 1, No. 1, Jul. 2005, pp. 46-51.

Xie, et al., "Bounded Fully Homomorphic Signature Schemes", In Proceedings IACR Cryptology ePrint Archive, vol. 2014, Oct. 10, 2014.

Elmehdwi, et al., "Secure k-Nearest Neighbor Query over Encrypted Data in Outsourced Environments", IIn Proceedings of CORR, Jul. 19, 2013, 23 pages.

Samanthula, et al., "k-Nearest Neighbor Classification over Semantically Secure Encrypted Relational Data", In Computing Research Repository, Mar. 10, 2014, 29 pages.

Qi, et al., "Efficient Privacy-Preserving k-Nearest Neighbor Search", In the 28th International Conference on Distributed Computing Systems, Jun. 17, 2008, pp. 311-319.

(56) References Cited

OTHER PUBLICATIONS

Kolesnikov, et al., "Improved Garbled Circuit Building Blocks and Applications to Auctions and Computing Minima", In 8th International Conference on Cryptology and Network Security, Dec. 12, 2009, pp. 125-144.
"Non Final Office Action Issued in U.S. Appl. No. 14/558,636", dated Aug. 23, 2016, 13 Pages.
Bost, et al., "Machine Learning Classification over Encrypted Data", In Proceedings of IACR Cryptology ePrint Archive, vol. 2014, Oct. 15, 2014, 34 Pages.
Huang, et al., "Quid-Pro-Quo-tocals: Strengthening Semi-Honest Protocols with Dual Execution", In Proceedings of 33rd IEEE Symposium on Security and Privacy, May 20, 2012, 13 Pages.
Kantarcioglu, et al., "Privacy-Preserving Data Mining in the Malicious Model", In International Journal Information and Computer Security, vol. 2, Issue 4, Jan. 1, 2009, 23 Pages.
Mohassel, et al., "Oblivious Decision Programs from Oblivious Transfer: Efficient Reductions", In Book—Financial cryptography and Data Security : 16th International Conference, Feb. 27, 2012, 15 Pages.
"International Search Report and Written Opinion Issued in PCT Application No. PCT/US2015/062846", dated Mar. 3, 2016, 11 Pages.
"International Search Report and Written Opinion Issued in PCT Application No. PCT/US2015/062847", dated Aug. 18, 2016, 13 Pages.
"Notice of Allowance Issued in U.S. Appl. No. 14/558,636", dated Mar. 13, 2017, 12 Pages.
Lindell, et al., "Privacy Preserving Data Mining", In Proceedings of the Annual International Cryptology Conference, Jan. 2000, 28 Pages.
Mohassel, et al., "How to Hide Circuits in MPC: An Efficient Framework for Private Function Evaluation", In Proceedings of the Annual International Conference on the Theory and Applications of Cryptographic Techniques, May 26, 2013, 34 Pages.
Naor, et al., "Efficient Oblivious Transfer Protocols", In Proceedings of the 12th Annual ACM-SIAM Symposium on Discrete Algorithms, Jan. 7, 2001, pp. 448-457.
Naor, et al., "Oblivious Transfer and Polynomial Evaluation", In Proceedings of the 31st Annual ACM Symposium on Theory of Computing, May 1, 1999, pp. 245-254.
Narayanan, et al., "Location Privacy via Private Proximity Testing", In NDSS, vol. 11, Jan. 2011, 17 Pages.
Pallier, Pascal, "Public-Key Cryptosystems Based on Composite Degree Residuosity Classes", In Proceedings of the International Conference on the Theory and Applications of Cryptographic Technique, May 2, 1999, 16 Pages.
Rabin, Michael O., "How to Exchange Secrets with Oblivious Transfer", In IACR Cryptology ePrint Archive, May 20, 1981, 26 Pages.
Shoup, Victor, "NTL: A Library for Doing Number Theory", Retrieved from <<http://www.shoup.net/ntl/>>, Jan. 2001, 2 Pages.
Singh, et al., "A Comparison of Non-Symmetric Entropy-Based Classification Trees and Support Vector Machine for Cardiovascular Risk Stratification", In IEEE Annual International Conference on Engineering in Medicine and Biology Society, Aug. 30, 2011, pp. 79-82.
Wu, et al., "Privately Evaluating Decision Trees and Random Forests", In ACR Cryptology ePrint Archive, Report 2015/386, Oct. 2016, 35 Pages.
Yao, Andrew Chi-Chih, "How to Generate and Exchange Secrets (Extended Abstract)", In Proceedings of the 27th Annual Symposium on Foundations of Computer Science, Oct. 27, 1986, pp. 162-167.
Zahur, et al., "Two Halves Make a Whole—Reducing Data Transfer in Garbled Circuits using Half Gates", In Proceedings of the Annual International Conference on the Theory and Applications of Cryptographic Techniques, Jan. 12, 2015, 22 Pages.
"Second Written Opinion Issued in PCT Application No. PCT/US2015/062846", dated Nov. 4, 2016, 7 Pages.

Wu, et al., "Privately Evaluating Decision Trees and Random Forests", In Proceedings on Privacy Enhancing Technologies, 2016(4):1-21.
"BigML", Retrieved from <<http://web.archive.org/web/20140101090546/https://bigml.com/>>, Jan. 1, 2014, 2 Pages.
"Microsoft Azure Machine Learning", Retrieved from <<http://web.archive.org/web/20151229060832/https://azure.microsoft.com/en-us/services/machine-learning/>>, Dec. 29, 2015, 10 Pages.
Agrawal, et al., "Privacy-Preserving Data Mining", In Proceedings of the ACM SIGMOD International Conference on Management of Data, May 16, 2000, pp. 439-450.
Asharov, et al., "More Efficient Oblivious Transfer and Extensions for Faster Secure Computation", In Proceedings of the ACM SIGSAC Conference on Computer & Communications Security, Nov. 4, 2013, pp. 535-548.
Azar, et al., "Decision Tree Classifiers for Automated Medical Diagnosis", In Neural Computing and Applications, vol. 23, Issue 7-8, Dec. 2013, pp. 2387-2403.
Bache, et al., "UCI Machine Learning Repository", In Journal of Computer and Communications, vol. 2, Issue 8, Jan. 2013, 1 Page.
Barni, et al., "Secure Evaluation of Private Linear Branching Programs with Medical Applications", In European Symposium on Research in Computer Security, Jan. 2009, 20 Pages.
Bellare, et al., "Efficient Garbling from a Fixed-Key Blockcipher", In Proceedings of the IEEE Symposium on Security and Privacy, May 19, 2013, 34 Pages.
Bellare, et al., "Foundations of Garbled Circuits", In Proceedings of the ACM Conference on Computer and Communications Security, Oct. 1, 2012, 45 Pages.
Bellare, et al., "On Defining Proofs of Knowledge", In Lecture Notes in Computer Science on Appears in Advances in Cryptology, vol. 740, Aug. 26, 1992, 28 Pages.
Blake, et al., "Strong Conditional Oblivious Transfer and Computing on Intervals", In Proceedings of the International Conference on the Theory and Application of Cryptology and Information Security, Jan. 2004, pp. 515-529.
Bogdanov, et al., "Sharemind: A Framework for Fast Privacy-Preserving Computations", In Proceedings of the 13th European Symposium on Research in Computer Security: Computer Security, Oct. 6, 2008, 23 Pages.
Boneh, Dan, "The Decision Diffie-Hellman Problem", In Proceedings of the 3rd International Symposium on Algorithmic Number Theory, Jun. 21, 1998, 14 Pages.
Bos, et al., "Private Predictive Analysis on Encrypted Medical Data", In Journal of Biomedical Informatics, vol. 50, Aug. 2014, 19 Pages.
Bos et al., "Selecting Elliptic Curves for Cryptography: An Efficiency and Security Analysis", In Journal of Cryptographic Engineering, vol. 6, Issue 4, 29 Pages.
Bos, et al., "Specification of Curve Selection and Supported Curve Parameters in MSR ECCLib", In Technical Report MSR-TR-2014-92, Microsoft Research, Jun. 2014, 4 Pages.
Brakerski, et al., "(Leveled) Fully Homomorphic Encryption Without Bootstrapping", In Proceedings of the 3rd Innovations in Theoretical Computer Science Conference, Jan. 8, 2012, pp. 309-325.
Breiman, Leo, "Random Forests", In Machine Learning, vol. 45, Issue 1, Jan. 2001, 28 Pages.
Brickell, et al., "Privacy-Preserving Remote Diagnostics", In Proceedings of the 14th ACM Conference on Computer and Communications Security, Oct. 28, 2007, pp. 498-507.
Camenisch, et al., "Efficient Group Signature Schemes for Large Groups (Extended Abstract)", In Proceedings of the 17th Annual International Cryptology Conference on Advances in Cryptology, Aug. 17, 1997, 15 Pages.
Canetti, Ran, "Security and Composition of Cryptographic Protocols: A Tutorial (Part I)", In ACM SIGACT News, vol. 37, Issue 3, Sep. 1, 2006, pp. 67-92.
Canetti, Ran, "Security and Composition of Multiparty Cryptographic Protocols", In Journal of Cryptology, vol. 13, Issue 1, Jun. 5, 1998, 46 Pages.

(56) References Cited

OTHER PUBLICATIONS

Chaum, et al., "Wallet Databases with Observers", In Proceedings of the 12th Annual International Cryptology Conference on Advances in Cryptology, Aug. 16, 1992, pp. 89-105.
Cramer, et al., "A Secure and Optimally Efficient Multi-Authority Election Scheme", In Lecture Notes in Computer Science on in Advances in Cryptology, vol. 1233, May 11, 1997, pp. 103-118.
Cramer, et al., "Proofs of Partial Knowledge and Simplified Design of Witness Hiding Protocols", In Proceedings of the 14th Annual International Cryptology Conference on Advances in Cryptology, Aug. 21, 1994, 14 Pages.
Crescenzo, et al., "Conditional Oblivious Transfer and Timed-Release Encryption", In Proceedings of the 17th International Conference on Theory and Application of Cryptographic Techniques, May 2, 1999, 16 Pages.
Damgard, et al., "A Generalization of Paillier's Public-Key System with Applications to Electronic Voting", In International Journal of Information Security, vol. 9, Issue 6, Dec. 1, 2010, 27 Pages.
Damgard, et al., "Efficient and Secure Comparison for On-Line Auctions", In Proceedings of the 12th Australasian Conference on Information Security and Privacy, Jul. 2, 2007, 15 Pages.
Demmler, et al., "ABY—A Framework for Efficient Mixed-Protocol Secure Two-Party Computation", NDSS Publisher, Jan. 2015, 15 Pages.
Du, et al., "Building Decision Tree Classifier on Private Data", In Proceedings of the IEEE International Conference on Privacy, Security and Data Mining, vol. 14, Dec. 1, 2002, 8 Pages.
Erkin, et al., "Privacy-Preserving Face Recognition", In Proceedings of the International Symposium on Privacy Enhancing Technologies Symposium, Jan. 2009, 19 Pages.
Fiat, et al., "How to Prove Yourself: Practical Solutions to Identification and Signature Problems", In Proceedings on Advances in Cryptology, Jan. 1987, 9 Pages.
Fredrikson, et al., "Model Inversion Attacks that Exploit Confidence Information and Basic Countermeasures", In Proceedings of the 22nd ACM SIGSAC Conference on Computer and Communications Security, Oct. 12, 2015, pp. 1322-1333.
Gentry, Craig, "A Fully Homomorphic Encryption Scheme", A Dissertation Submitted to the Department of Computer Science and the Committee on Graduate Studies of Stanford University in Partial Fulfillment of the Requirement for the Degree of Doctor of Philosophy, Sep. 2009, 209 Pages.
Goldreich, Oded, "Foundations of Cryptography", In Book of Foundations of Cryptography, Basic Applications, Cambridge University Press, vol. 2, Aug. 4, 2002, 24 Pages.
Goldwasser, et al., "Probabilistic Encryption", In Journal of Computer and System Sciences, vol. 28, Issue 2, Apr. 1984, pp. 270-299.
Goldwasser, et al., "The Knowledge Complexity of Interactive Proof-Systems (Extended Abstract)", In Proceedings of the 17th Annual ACM Symposium on Theory of Computing, May 6, 1985, pp. 291-304.
Graepel, et al., "ML Confidential: Machine Learning on Encrypted Data", In Proceedings of the 15th International Conference on Information Security and Cryptology, Nov. 28, 2013, 15 Pages.
Granlund, et al., "GNU MP: The GNU Multiple Precision Arithmetic Library", Retrieved from <<http://gmplib.org/.>>, Dec. 19, 2016, 4 Pages.
Halevi, et al., "Algorithms in HElib", In Proceedings of the International Cryptology Conference, Jan. 2014, 20 Pages.
Hastad, et al., "A Pseudorandom Generator from Any One-Way Function", In SIAM Journal on Computing, vol. 28, Issue 4, Mar. 1, 1999, 46 Pages.
Hastie, et al., "The Elements of Statistical Learning", In Springer Series in Statistics, Second Edition, Jan. 2001, pp. 305-317 and 587-604.
Hazay, et al., "Efficient Secure Two-Party Protocols—Techniques and Constructions", In Information Security and Cryptography, Jul. 14, 2010, 30 Pages.
Huberman, et al., "Enhancing Privacy and Trust in Electronic Communities", In Proceedings of the 1st ACM Conference on Electronic Commerce, Nov. 1, 1999, 9 Pages.
Ishai, et al., "On Achieving the "Best of Both Worlds" in Secure Multiparty Computation", In SIAM Journal on Computing, vol. 40, Issue 1, 23 Pages.
Katz, et al., "Constant-Round Private Function Evaluation with Linear Complexity", In Proceedings of the 17th International Conference on The Theory and Application of Cryptology and Information Security, Dec. 4, 2011, 16 Pages.
Kilian, Joe, "Founding Cryptography on Oblivious Transfer", In Proceedings of the 20th Annual ACM Symposium on Theory of Computing, Jan. 1, 1998, 12 Pages.
Koh, et al., "A Two-Step Method to Construct Credit Scoring Models with Data Mining Techniques", In International Journal of Business and Information, vol. 1, Issue 1, Jan. 2006, pp. 96-118.
Kolesnikov, et al., "Improved Garbled Circuit: Free XOR Gates and Applications", In Proceedings of the 35th International Colloquium on Automata, Languages and Programming, Part II, Jul. 7, 2008, 12 Pages.
Lindell, et al., "A Proof of Security of Yao's Protocol for Two-Party Computation", In Journal of Cryptology, vol. 22, Issue 2, Apr. 6, 2009, 28 Pages.
"International Preliminary Report on Patentability Issued in PCT Application No. PCT/US2015/062846", dated Mar. 13, 2017, 8 Pages.
Notice of Allowance Issued in U.S. Appl. No. 14/558,636, dated Jun. 12, 2017.

\* cited by examiner

Set of feature vectors 300
    feature vector i 302
        identifier 306
        feature j 304
        ...
    ...

Database 310
    record 312
        identifier 306
        information 308
    ...

Feature vector 320
    feature 1 322
    ...
    feature n

SECURE COMPUTER EVALUATION OF K-NEAREST NEIGHBOR MODELS

BACKGROUND

A k-nearest neighbor model is a form of classifier which is commonly implemented on a computer for machine learning and machine pattern recognition tasks. It is often desirable to implement a classifier on a computer in a way that allows other computers to submit input data to be applied to the classifier and to receive results from the classifier. However, in some situations, an entity providing input data does not want other entities to access that input data. Similarly, an entity providing the classifier does not want another entity to learn any information about the classifier, other than the result corresponding to the input data provided by that entity.

SUMMARY

This Summary is provided to introduce a selection of concepts in a simplified form that are further described below in the Detailed Description. This Summary is intended neither to identify key or essential features, nor to limit the scope, of the claimed subject matter.

A user device and one or more server computers securely evaluate a k-nearest neighbor model, with reasonable computation speed and bandwidth utilization, using a combination of techniques. The user device encrypts input vectors using a client's public key to keep client information private. The server computer homomorphically computes a distance between the encrypted input vector and vectors stored in the k-nearest neighbor model. The server computer then engages in a minimization process which results in the user device receiving classification vectors corresponding to the k-nearest neighbors.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
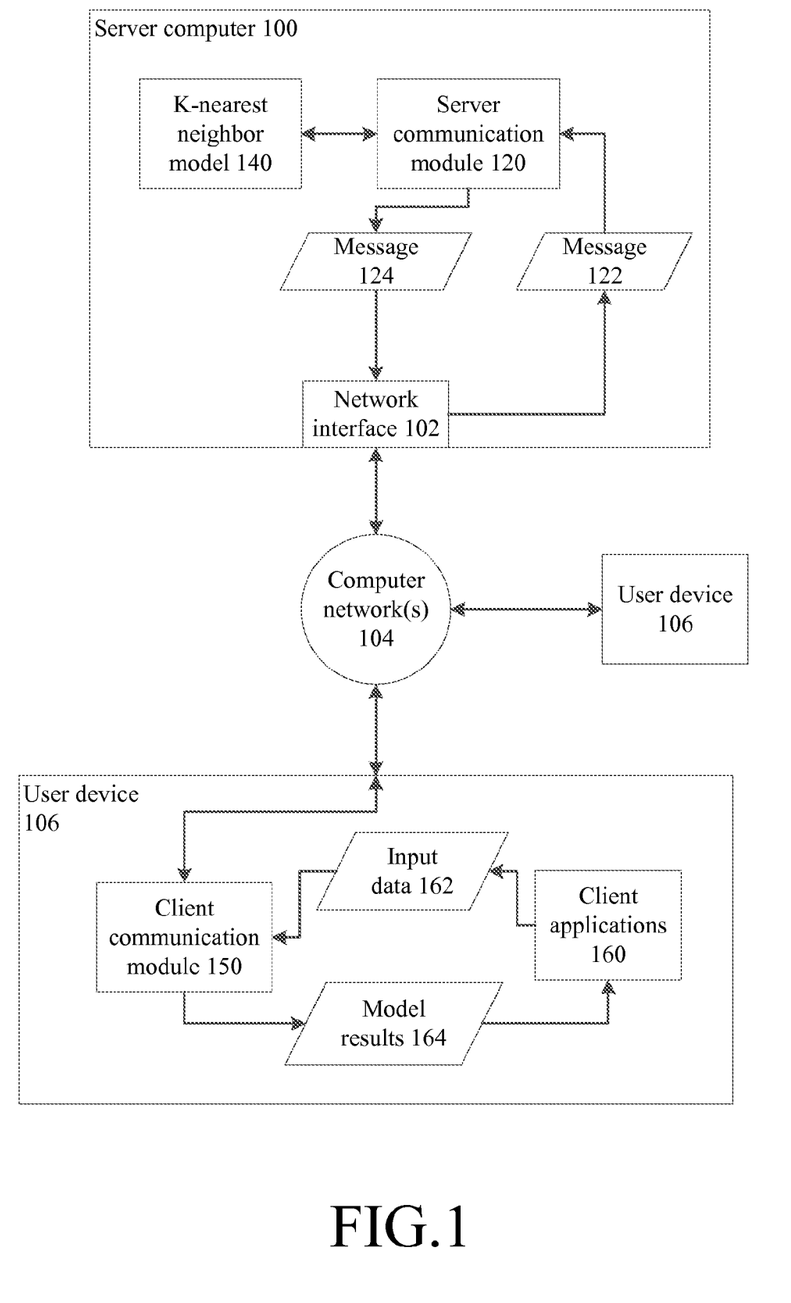
FIG. 1 is a block diagram of an example application environment in which a server computer makes a k-nearest neighbor model available for use by user devices.

Referring to FIG. 1, an example implementation of a computer system for secure evaluation of k-nearest neighbor models, and its operating environment, will now be described.

In FIG. 1, a server computer 100, implemented using one or more computers such as described below in connection with FIG. 8, hosts a computer implementation of one or more k-nearest neighbor models 140, such as described in more detail below. The server computer 100 has one or more network interfaces 102 to connect to one or more computer networks 104. The computer network 104 allows user devices 106 to connect to and communicate with the server computer 100. User devices 106 also are implemented as one or more computers such as described below in connection with FIG. 8.

The server computer 100 includes a server communication module 120 which implements a communication protocol for managing the server side of communication between the user devices and the server computer over the computer network. The server communication module processes messages 122 from user devices 106 and converts them into commands applied to the k-nearest neighbor model 140. The server communication module also converts results received from the k-nearest neighbor model 140 into messages 124 returned to the user devices 106. An example of such a server communication module is a secure hypertext transfer protocol (HTTPS) server program, executed as an HTTPS process on the server computer 100, which processes HTTPS messages from and to user devices. The HTTPS process generally is configured, in turn, to transmit commands to other processes executed on the server computer, such as a process that results from executing computer program instructions that define the one or more k-nearest neighbor models 140.

Similarly, user devices 106 include a client communication module 150 which implements the communication protocol for managing the client side of communication between the user devices 106 and the server computer 100 over the computer network. The client communication module controls the user device to transmit messages 122 from the user device 106 to the server computer over the computer network. The client communication module processes messages 124 returned to the user devices 106 from the server computer. The client communication module implements the same communication protocol as the server computer 100, such as HTTPS or other secure protocol. An example of such a client communication module is a secure hypertext transfer protocol (HTTPS) client program, executed as a process on the user device 106, which processes HTTPS messages to and from server computers. The HTTPS client process generally is configured, in turn, to transmit contents of messages from the server computer to other processes executed on the user device. Herein, these other processes are called "client applications" 160.

A client application 160, in this context, is a computer program executed on the user device, which causes the user device to generate input data 162 for processing by the one or more k-nearest neighbor models 140 on the server computer 100. In general, such a client application 160 receives the results 164 obtained by having the k-nearest neighbor model 140 process the input data 162.

A client application can take any of a variety of forms, depending on the nature of the input data 162 to be processed and how it is processed by the k-nearest neighbor models. Generally speaking, the input data is a form of a vector of one or more values. For example, the k-nearest neighbor model can implement a machine learning process for a control system in which stored vectors are matched to machine action. In response to an input vector, the k-nearest stored vectors are identified. Machine actions are associated with the k-nearest neighbors to the input vector are identified. A k-nearest neighbor model can identify a set of records from a database that are similar to a given record. For example, a recommendation engine may store a database of information about books, movies, music or other content. An input vector can be matched to vectors of features derived from the database, to determine a set of k-nearest neighbors. The identity of the books, movies, music or other content corresponding to the identified k-nearest neighbors can be used to recommend content.

The invention is not limited to the nature of k-nearest neighbor model; instead, the security of such remote utilization of k-nearest neighbor models is provided through a system such as described herein. In such applications, the client application provides the input data to the client communication module 150, and receives the results from one or more k-nearest neighbor models through the client communication module. In many such applications, the input data from the client application can be sensitive information for which privacy or confidentiality is to be maintained. Further, the data within the k-nearest neighbor model may also be proprietary or confidential and access to this data is to be restricted. This system evaluates the k-nearest neighbor model securely, with reasonable computation speed and bandwidth utilization.

There are a variety of possible implementations of such a computer system, depending on the environment in which it is deployed.

For example, the server computer may be connected to a publicly accessible computer network, such as the internet, and can accept connection requests from any kind of user device that can connect to the internet and communicate with the server computer. In such a case, the user device(s) can be, for example, a mobile phone, television set top box, smart television, personal computer, portable computer, tablet, slate or other handheld computer, game console or the like. In some implementations, the user device is configured to respond to user input to submit input data to the server computer for processing using the k-nearest neighbor model. In yet other implementations, the server computer and computer network can be deployed for access by user devices that are programmed to utilize the server computer's k-nearest neighbor models without user intervention. The client computer and server computer can be deployed with complementary communication modules to allow them to communicate over the computer network. The server computer also can be configured to distribute a computer program to the user device, after establishing a communication connection with the user devices, so as to provide a communication module and/or a client application to be executed on the user device.

Figure 2:
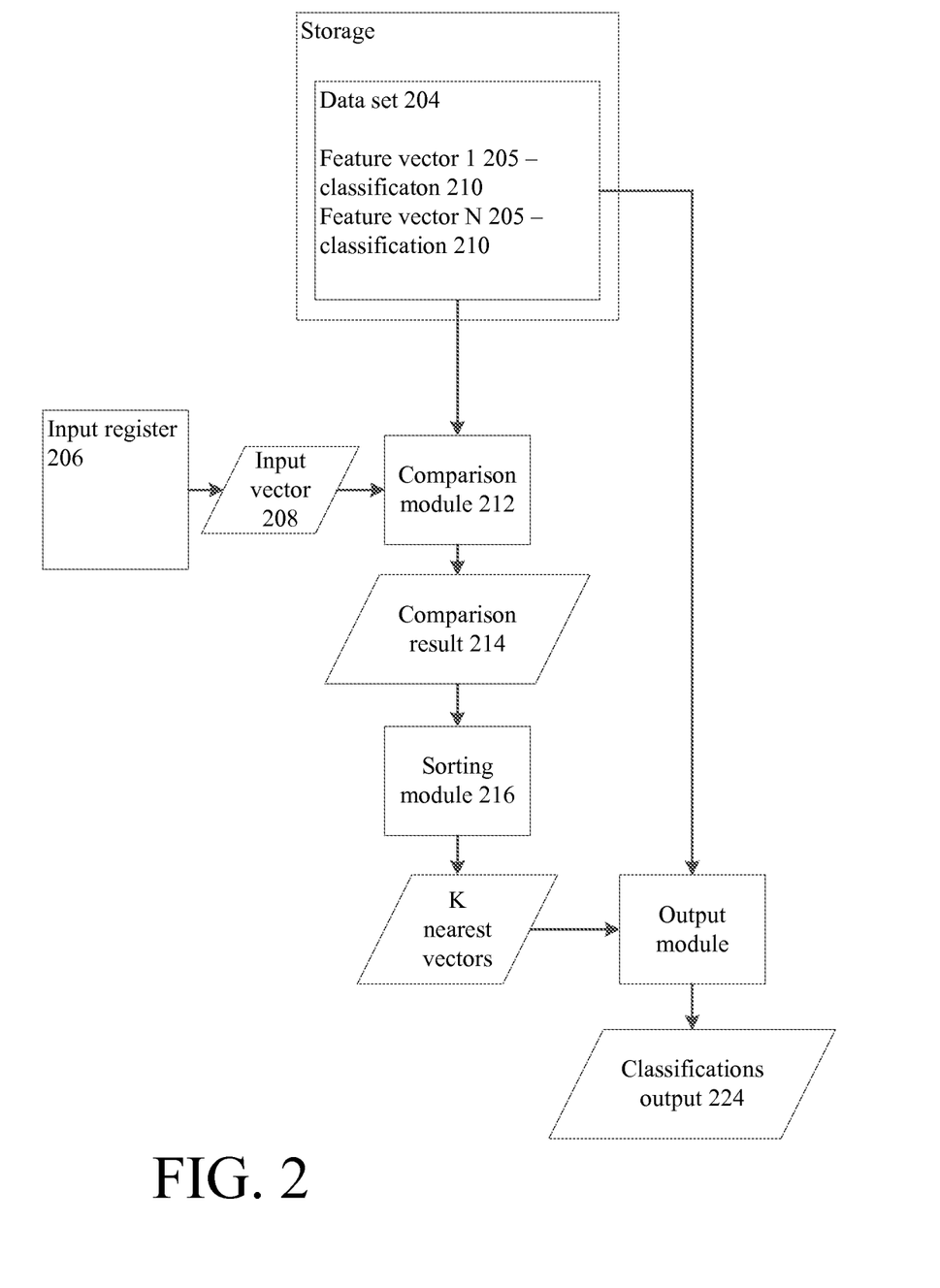
FIG. 2 illustrates an illustrative example of a k-nearest neighbor model.

Referring to FIG. 2, an illustrative example of a k-nearest neighbor model will now be described. This example is simplified to illustrate how a k-nearest neighbor model works, to assist in understanding the example implementations described in further detail below. The example implementations described below provide a way to practically implement secure evaluation of one or more k-nearest neighbor models given a user input.

As shown in FIG. 2, a k-nearest neighbor model 200 includes storage 202 for a large set 204 of feature vectors 205, and an input register 206 for storing an input vector 208. Each feature vector 205 may have a corresponding classification 210. The classifications 210 may be stored as a vector in order of identifiers associated with the feature vectors 205. The model 200 includes a comparison module 212 that compares the input vector 206 to the set of feature vectors using a multi-dimensional similarity or distance metric, providing a comparison result 214 for each feature vector. Example similarity metrics include, but are not limited to, Hamming distance and Euclidean distance. A sorting module 220 receives the comparison results 214 for each feature vector to maintain a set 216 of the k-nearest feature vectors 205 to the input vector. An output module 222 has an input that receives the set 216 of k-nearest feature vectors to provide a classification output 224 of the model 200. The classification output can be, for example, the classification vectors associated with the k-nearest feature vectors, an aggregation of such classification vectors, an aggregation of the k-nearest feature vectors, and the like.

It should be understood, in view of the example implementations below, that some of the processing of the k-nearest vectors and classification output is performed in part by the client and server communication modules in FIG. 1 and not solely by the k-nearest neighbor model 140 in FIG. 1, which is intended to represent the data used by the model, such as the data set 204 in FIG. 2.

One example of a k-nearest neighbor model is one in which each feature of an input vector is a binary value. In such an implementation, a useful similarity metric is called a Hamming distance metric, which given two vectors of features, provides an output vector of binary values, indicating, for each feature, whether the values for the features in the two vectors match. A Hamming weight or distance can be computed as a number of features for which the values in the two vectors match. The k vectors with the least Hamming weights are the "k-nearest neighbors."

A k-nearest neighbor model typically is created by aggregating a large set of training data and processing it to provide a set of feature vectors and classification vectors. Such learning or training processes are typically performed once to create such a model, but the data set can be continually grown as new data becomes available. K-nearest neighbor models can be replicated and deployed in multiple devices. The present invention is not limited to any particular learning or training process used to develop a k-nearest neighbor model.

In a typical unsecure computer implementation of k-nearest neighbor models, the parameters defining the model are fixed, and the input vectors and output values are typically unencrypted. It would be possible, in such an implementation in the context of remotely processed k-nearest neighbor models, for an entity to learn about the data in the data set supporting the model by applying a set of input vectors to the model and analyzing the results. Conversely, it would be possible for an entity providing a model to store input vectors supplied for processing, and associate each entity with its input vectors, and in turn to learn about the information provided by each entity.

A k-nearest neighbor model can be securely evaluated in practical applications, with reasonable computation speed and bandwidth utilization, using a combination of techniques. First, input vectors from the user device are encrypted with the public key of the user device to keep user information private. Second, the server computer homomorphically computes the comparisons between the input vectors and the stored feature vectors, for which the results also are encrypted. A minimum operation is then homomorphically computed on the encrypted results k times, to provide the k-nearest neighbors. The identities of the k-nearest neighbors also can be protected from the server computer by having the user device and the server computer engage in a shared secret protocol to create a one-time permutation of the database.

Figure 3:
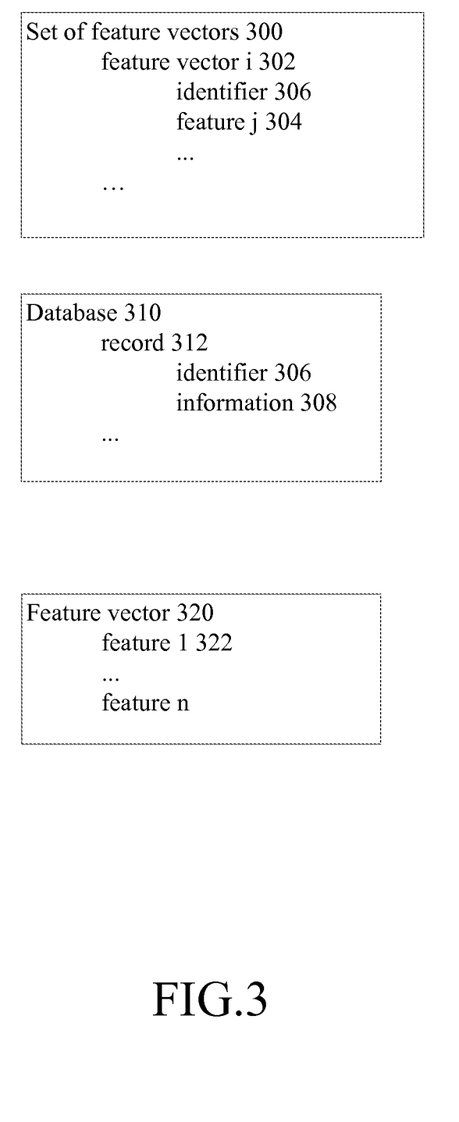
FIG. 3 is a diagram of example data structures for representing a k-nearest neighbor model.

Referring now to FIG. 3, a set of data structures for storing data representing a k-nearest neighbor model will now be described. In view of the foregoing description of FIG. 2, a k-nearest neighbor model can be defined in a data structure, as shown in FIG. 3, by the combination of a set 300 of feature vectors 302, each feature vector containing n features, 304. Each feature vector 302 can have an identifier 306. A database 310 (which can be implemented as an array in storage, for example) can have records 312 associating identifiers 306 to information 308 associated with the feature vector, such as a classification or other information.

The input to a k-nearest neighbor model is a feature vector 320, which can include a large number of features 322 which depend on the client application. The number of features 322 is typically the same as the number of features in the feature vectors 302. To simplify computations, the feature vector preferably is processed so that all values are integers greater than or equal to zero.

The input feature vector is encrypted within the user device using the client's public key and is considered private data from the perspective of the server computer that processes the encrypted feature vector using the k-nearest neighbor model. Similarly, data returned by the server computer to the user device also is encrypted using the client's public key. The cryptosystem is additively homomorphic and supports scalar multiplication. As a simplification in the selection of a cryptosystem, the processing below also avoids decrypting arbitrary ciphertexts. The primary operation used is to test whether a given ciphertext is an encryption of "0". An example of such a cryptosystem is the exponential ElGamal cryptosystem.

Figure 4:
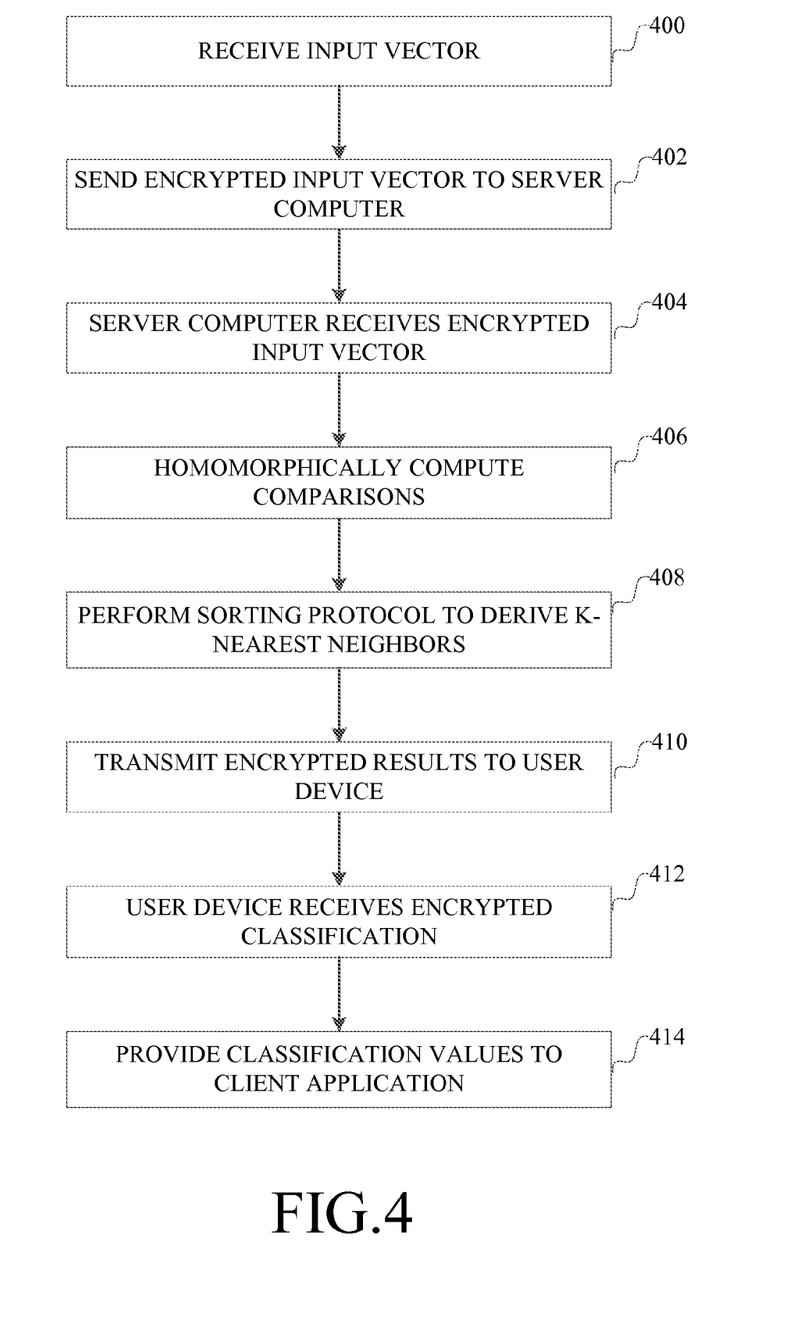
FIG. 4 is a flow chart describing operation of an example implementation of such a computer system.

In this example implementation, a general process for securely evaluating an input vector with a k-nearest neighbor model can be performed, in one implementation, in a manner such as described in FIG. 4. Different implementations of this process are described in more detail in connection with FIGS. 5-7.

The client communication module receives 400 the input vector from the client application. The client communication module encrypts 402 the input vector with the client's public key and transmits the encrypted input vector to the server computer over the computer network. The server computer receives 404 the encrypted input vector, where it is processed by the server communication module. The server computer homomorphically computes 406 the distance metric between the input vector and each of multiple vectors in the model.

At this stage, the server computer generally performs 408 a sorting protocol in which the determined weights or distances for each vector are compared to derive a set of k-nearest neighbors to the input vector. Some example implementations of this protocol are described in more detail below. The result of the comparison protocol is an encrypted representation of the classification information corresponding to the k nearest vectors in the model to the input vector. The server communication module transmits 410 the encrypted results to the user device, which is received 412 by the client communication module. The client communication module in turn provides 414 the classification information to the client application.

Figure 5:
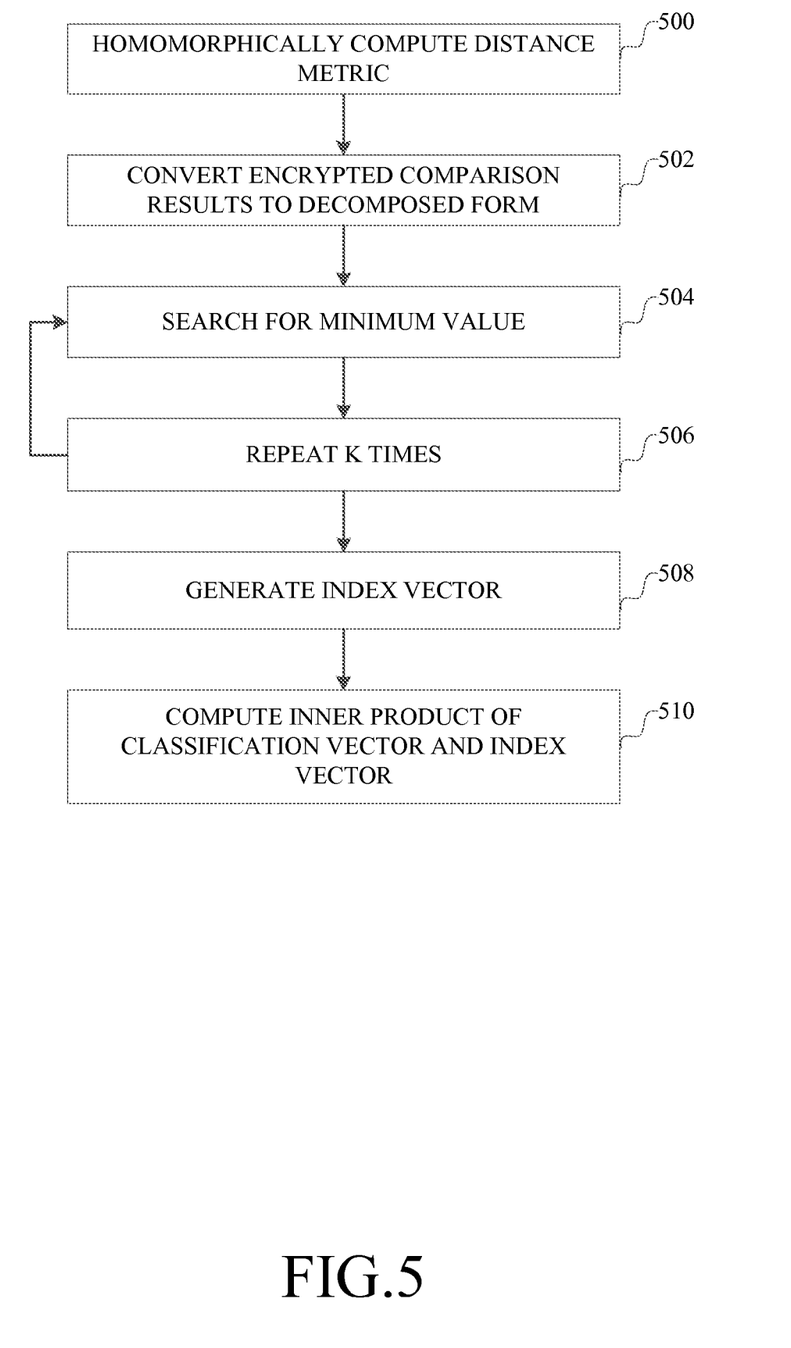
FIG. 5 is a flow chart describing operation of an example implementation.

One example implementation is described in more detail in connection with FIG. 5. This implementation is based on fully homomorphic computations.

In this implementation, the server computer homomorphically computes 500 a distance metric between the encrypted input vector and each vector in the model, thus providing an encrypted comparison result. In implementations where in input vector is a set of binary features, the distance metric can be the Hamming distance metric, and the encrypted comparison result is an encrypted Hamming vector.

Next, the encrypted comparison results are converted 502 to a decomposed form to simplify comparisons. As described in more detail below, multiple comparisons are performed to sort the encrypted comparison results to locate the k-nearest vectors to the input vector. This decomposition of the encrypted comparison results simplifies this sorting.

Bit decomposition involves receiving an encrypted Hamming vector, e.g., $Enc(v)=\{Enc(v[0]), \ldots, Enc(v[d])\}$, where v[i] is the homomorphically computed difference between the ith features of the encrypted input vector and a vector from the model. The bit decomposition provides $Enc(s0), \ldots Enc(sL)$, such that:

$$\|v\|=s0*2^0+s1*2^1+\ldots+sL*2^L.$$

The encrypted values of Enc(so) through Enc(sL) are computed by building and homomorphically evaluating a computational circuit using the following. After initializing s0, . . . , sL to zero, for each i=1, . . . d, update sj (j=1, . . . , L) as follows:

$$s_j^{new} \leftarrow s_j^{old} + v[i] \prod_{i=0}^{j-1} s_i^{old}.$$

Given the decomposed comparison results, the server computer searches 504 for a minimum value among the results. This search is performed k times, as indicated at 506, to generate the k-nearest neighbors.

To perform the minimization, a comparison tree is constructed using the encrypted bit-decomposed values. When comparing two values di and dj, a Boolean value bij:=di>dj. Two encrypted bit-decomposed values di and dj can be homomorphically compared to produce and encrypted value Enc(bij), as follows:

$$\min\{d_i,d_j\}=Enc(b_{ij}\cdot d_j+(1-b_{ij})\cdot d_i)$$

$$\arg\min\{d_i,d_j\}=Enc(b_{ij}\cdot j+(1-b_{ij})\cdot i).$$

The argmin equation allows for an index for the minimum value to be computed in encrypted form as well. An index vector of binary values, each representing one of the stored vectors, can be generated 508 by including a "1" for each vector which is one of the k-nearest neighbors. Computing 510 an inner product of this vector with the classification vector for the model returns a classification for the input vector.

Figure 6:
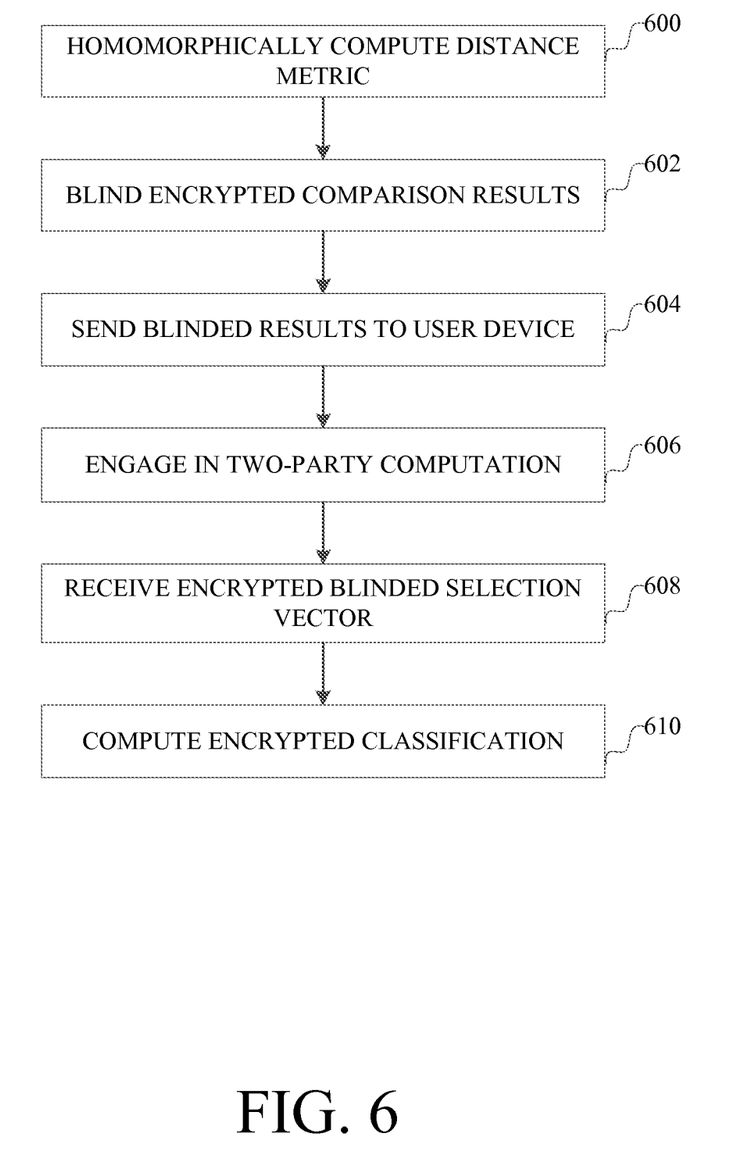
FIG. 6 is a flow chart describing operation of an example implementation.

Another example implementation is described in more detail in connection with FIG. 6. This implementation uses a combination of homomorphic computations and a computational circuit representation of a solution. A somewhat homomorphic encryption scheme supporting quadratic homomorphism can be used. Examples of such a cryptosystem include, but are not limited to, the Boneh-Goh-Nissim (BGN) cryptosystem or the Brakerski-Gentry-Vaikuntanathan (BGV) cryptosystem, and other cryptosystems based on lattices or approximate greatest common divisor (gcd).

In this implementation, the server computer homomorphically computes 600 a distance metric between the encrypted input vector and each vector in the model, thus providing an encrypted comparison result. In implementations where an input vector is a set of binary features, the distance metric can be the Hamming distance metric, and the encrypted comparison result is an encrypted Hamming weight.

In particular, for each of i stored vectors b(i) with a number d of features, the server computer computes (EncA (bi[0]); . . . ; EncA(bi[d])), wherein EncA indicates encryption with the client's public key. The server computer computes the Hamming distance vector (EncA(bi[0]−a[0]); . . . ; EncA(bi[d]−a[d])), and computes the Hamming weights EncA(di) by summing the squares of the entries.

The server computer then blinds 602 the encrypted comparison results and transmits 604 them to the user device. For example, the server computer draws random blinder values ri for each stored vector i. The server computer homomorphically computes EncA(di+ri) and transmits these values to the user device.

The user device and the server computer then engage 606 in a two-party computation of the k-nearest neighbors.

The user device defines a random vector y=(y1; . . . ; yn), with a randomly drawn value yi for each stored vector I. The user device prepares a computational circuit using the binary representations of ri and di+ri, computes a vector x+y, where x=(x0; . . . ; xn) such that xi=1 if i is among the k nearest neighbors of a, and 0 otherwise. The point of the vector y is to blind the result computed by the user device, so that the server computer does not learn actual identities of the k nearest neighbors, which contain information about the input vector. The computational circuit computes the vector x, which is known as a "selection problem", which computes a kth order statistic. In particular, it extracts the minimum k times, but excluding previous minima it each iteration.

Using the k-nearest neighbors, the user device and server computer produce a classification of the input vector. In particular, the user device then sends EncA(y)=(EncA(y1); . . . ; EncA(yn)), a blinded, encrypted selection vector, to the server computer, which the server computer receives 608 and processes to obtain x+y. The server computer then can compute EncA(x)=(EncA(x1); . . . ; EncA(xn)). The server computer can then compute 610 the inner product of EncA(x) with a classification vector c of the model to obtain an encryption of a classification of the input vector, which is sent to the user device where it can be encrypted. Because this operation is an inner product with a plaintext vector, this operation can be implemented with an encryption scheme such as Paillier encryption using the client's public key.

Figure 7:
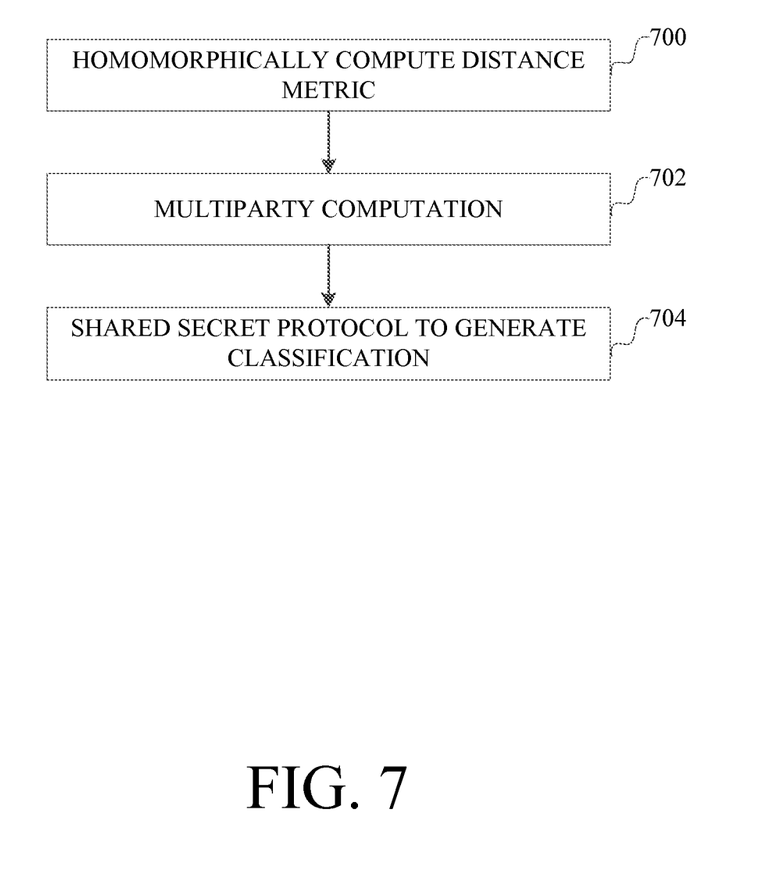
FIG. 7 is a flow chart describing operation of an example implementation.

Another example implementation is described in more detail in connection with FIG. 7. This implementation uses a combination of homomorphic computations and multiparty computation.

In this implementation, the server computer homomorphically computes 700 a distance metric between the encrypted input vector and each vector in the model, thus providing an encrypted comparison result. In implementations where in input vector is a set of binary features, the distance metric can be the Hamming distance metric, and the encrypted comparison result is an encrypted Hamming weight.

Next the user device and server computer execute 702 a multi-party comparison protocol to perform comparisons and determine the k-nearest neighbors.

In this example implementation, entries of the feature vectors are 0 or 1, and are presented bitwise. To compare the norm of two Hamming vectors EncA(vi) and EncA(vj), where vi=a−bi and vj=a−bj, the following interactive protocol is followed.

First, the server computer randomly chooses, with probability ½, whether to check if i>j or if j>i. For the rest of the description, suppose without loss of generality that the server computer checks the former. This decision can be represented by a bit K. The server computer uses a quadratic homomorphic scheme to evaluate EncA(di), where di=∥a−bi∥. The server computer then generates the set:

$$\{EncA(di-vj[0]); EncA(di-vj[0]-vj[1]); \ldots ; EncA(di-vj[0]-\ldots-vj[d])\}.$$

Note that di>dj if and only if this set contains an encryption of zero. The server computer can test this set for an encryption of zero by multiplying each element of the set by a non-zero element of the ciphertext space $(Z/N)^*$, and then apply a random permutation. The server computer then sends the set to user device, which returns an encryption of 1 if 0 appears, and an encryption of 0 otherwise. The server computer can then modify this appropriately using his knowledge of the initial decision bit B to obtain an encryption of the result of the comparison.

Finally, the user device and server computer engage 704 in a shared secret protocol to retrieve the classification vector. In particular, the server computer and the user device each generate a random permutation, and apply them in sequence to the classification vector and a vector representing the k-nearest neighbors. The combination of the two can be used by the user device to extract the classifications.

In the foregoing example implementations, a k-nearest neighbor model is securely evaluated. A set of distances between an encrypted input vector and a set of vectors in a nearest neighbor model are homomorphically computed, from which the k-nearest neighbors are identified by a user device. The user device in turn obtains a classification from the server computer corresponding to the k-nearest neighbors.

In one aspect, a server computer includes a processor, memory connected to the processor to allow access by the processor to data stored in the memory, persistent storage connected to the processor to allow access by the processor to data stored in the persistent storage, a network interface connected to the processor and the memory to allow access by the server computer to a computer network and to allow the server computer to communicate messages over the computer network to and from user devices, and computer program instructions stored in at least one of the memory and persistent storage. When processed by the processor, the computer program instructions instruct the processor to store an encrypted input vector received from a user device in memory, wherein the input vector is encrypted using a public key related to the user device; homomorphically compute an encrypted distance between the encrypted input vector and each of a plurality of stored vectors; engage in a sorting protocol using the computed encrypted distances, the protocol resulting in the server computer receiving an encrypted representation of identities of k-nearest neighbors to the input vector from among the plurality of stored vectors; generate in memory an encrypted representation of a classification corresponding to the input vector; and transmit the encrypted representation of the classification to the user device.

In one aspect, a user device includes a processor, memory connected to the processor to allow access by the processor to data stored in the memory, persistent storage connected to the processor to allow access by the processor to data stored in the persistent storage, a network interface connected to the processor and the memory to allow access by the server computer to a computer network and to allow the server computer to communicate messages over the computer network to and from user devices, and computer program instructions stored in at least one of the memory and persistent storage. When processed by the processor, the computer program instructions instruct the processor to transmit an encrypted input vector to a server computer; engage in a sorting protocol using encrypted distances computed by the server, the protocol resulting in the server computer receiving an encrypted representation of identities of k-nearest neighbors to the input vector from among the plurality of stored vectors; receive from the server computer an encrypted representation of a classification corresponding to the input vector; and decrypt the encrypted representation of the classification in the memory.

In one embodiment, the sorting protocol comprises homomorphically computing a minimum operation k times. The server computer and the user device can create a permutation of a classification vector, mapping identities of the plurality of stored vectors to classification information.

In another embodiment, computing encrypted comparison results includes computing a bit decomposition of each comparison result. The sorting protocol can include homomorphically computing a computational circuit using the bit decompositions of the comparison results.

In another embodiment, the sorting protocol includes blinding the encrypted comparison results and transmitting the blinded encrypted comparison results to the user device. The sorting protocol can include receiving a selection vector including blinded results identifying k-nearest neighbors from the user device, and applying the selection vector to a classification vector.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Having now described an example implementation of a computer system for secure evaluation of k-nearest neighbor models, an example implementation of a computer as may be used to implement such a computer system will now be described.

The computer generally includes computer hardware, such as described in FIG. 8 below, and computer programs providing instructions to be executed by the computer. Computer programs on a general purpose computer generally include an operating system and applications. The operating system is a computer program running on the computer that manages access to various resources of the computer by the applications and the operating system. The various resources generally include memory, storage, communication interfaces, input devices and output devices.

The computer can be any type of general-purpose or special-purpose computer, such as a tablet computer, hand held computer, smart phone, laptop or notebook computer, wearable computing device, or any other computing device, regardless of size or environment, more details and examples of which are discussed below in connection with FIG. 8.

Figure 8:
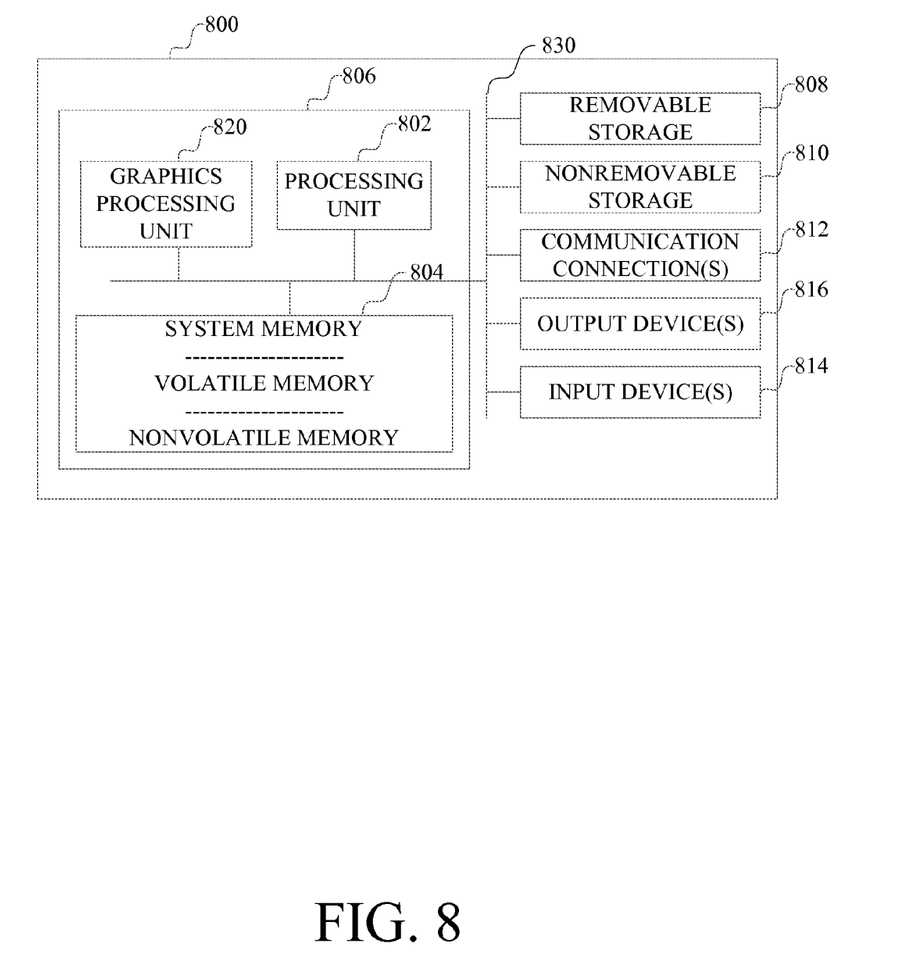
FIG. 8 is a block diagram of an example computer with which components of such a system can be implemented.

FIG. 8 illustrates an example of computer hardware of a computer with which the various components of the system of FIGS. 1-7 can be implemented using computer programs executed on this computer hardware. The computer hardware can include any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, network PCs, minicomputers, mainframe computers, and distributed computing environments that include any of the above types of computers or devices, and the like.

With reference to FIG. 8, an example computer 800 includes at least one processing unit 802 and memory 804. The computer can have multiple processing units 802 and multiple devices implementing the memory 804. A processing unit 802 can include one or more processing cores (not shown) that operate independently of each other. Additional co-processing units, such as graphics processing unit 820, also can be present in the computer. The memory 804 may include volatile devices (such as dynamic random access memory (DRAM) or other random access memory device), and non-volatile devices (such as a read-only memory, flash memory, and the like) or some combination of the two. This configuration of memory is illustrated in FIG. 8 by dashed line 806. The computer 800 may include additional storage (removable and/or non-removable) including, but not limited to, magnetically-recorded or optically-recorded disks or tape. Such additional storage is illustrated in FIG. 8 by removable storage 808 and non-removable storage 810. The various components in FIG. 8 are generally interconnected by an interconnection mechanism, such as one or more buses 830.

A computer storage medium is any medium in which data can be stored in and retrieved from addressable physical storage locations by the computer. Computer storage media includes volatile and nonvolatile memory devices, and removable and non-removable storage media. Memory 804 and 806, removable storage 808 and non-removable storage 810 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 800 may also include communications connection(s) 812 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 812 are devices, such as a network interface or radio transmitter, that interface with the communication media to transmit data over and receive data from signals propagated through communication media.

Computer 800 may have various input device(s) 814 such as a keyboard, mouse, pen, camera, microphone, touch input device, sensors, and so on. Output device(s) 816 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 810, communication connections 812, output devices 816 and input devices 814 can be integrated within a housing with the rest of the computer, or can be connected through various input/output interface devices on the computer, in which case the reference numbers 810, 812, 814 and 816 can indicate either the interface for connection to a device or the device itself as the case may be.

Each component (which also may be called a "module" or "engine" or the like, or for which operation may be described by a flow chart), of a computer system such as described in FIGS. 1-7 above, and which operates on a computer, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

This computer system may be practiced in distributed computing environments where operations are performed by multiple computers that are linked through a communications network. In a distributed computing environment, computer programs may be located in both local and remote computer storage media.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A computer system comprising:
    a server computer, comprising a processor, memory connected to the processor to allow access by the processor to data stored in the memory, persistent storage connected to the processor to allow access by the processor to data stored in the persistent storage, a network interface connected to the processor and the memory to allow access by the server computer to a computer network and to allow the server computer to communicate messages over the computer network to and from user devices, and computer program instructions stored in at least one of the memory and persistent storage of the server computer that, when processed by the processor, instruct the processor to:
    store, in the memory, an encrypted input vector received from a user device over the computer network and through the network interface, wherein the encrypted input vector is encrypted using a public key related to the user device;
    homomorphically compute, using the processor, encrypted distances between the received encrypted input vector and each of a plurality of stored vectors;
    sorting, in communication with the user device, the computed encrypted distances, such that the user device sends to the server computer an encrypted representation of identities of k-nearest neighbors to the input vector from among the plurality of stored vectors;
    generate in the memory, using the processor, an encrypted representation of a classification corresponding to the input vector based on the encrypted representation of the identities of the k-nearest neighbors to the input vector; and
    transmit the encrypted representation of the classification through the network interface and over the computer network to the user device, wherein the user device is operative to decrypt the transmitted encrypted representation of the classification to provide a classification of the encrypted input vector at the user device.

2. The computer system of claim 1, wherein sorting comprises homomorphically computing a minimum operation k times.

3. The computer system of claim 2, wherein the server computer and the user device create a permutation of a classification vector, mapping identities of the plurality of stored vectors to classification information.

4. The computer system of claim 1, wherein sorting includes computing a bit decomposition of each comparison result.

5. The computer system of claim 4, wherein sorting comprises homomorphically computing a computational circuit using the bit decompositions of the comparison results.

6. The computer system of claim 1, wherein sorting includes blinding encrypted comparison results and transmitting the blinded encrypted comparison results to the user device.

7. The computer system of claim 6, wherein sorting includes receiving a selection vector including blinded results identifying k-nearest neighbors from the user device, and applying the selection vector to a classification vector.

8. A computer implemented process performed by a server computer, comprising a processor, memory connected to the processor to allow access by the processor to data stored in the memory, persistent storage connected to the processor to allow access by the processor to data stored in the persistent storage, a network interface connected to the processor and the memory to allow access by the server computer to a computer network and to allow the server computer to communicate messages over the computer network to and from user devices, and computer program instructions stored in at least one of the memory and persistent storage of the server computer that, when processed by the processor, instruct the processor to perform a process comprising:

storing, in the memory, an encrypted input vector received from a user device over the computer network and through the network interface, wherein the encrypted input vector is encrypted using a public key related to the user device;

homomorphically computing, using the processor, encrypted distances between the received encrypted input vector and each of a plurality of stored vectors;

sorting the computed encrypted distances in communication with the user device such that the user device sends to the server computer an encrypted representation of identities of k-nearest neighbors to the input vector from among the plurality of stored vectors;

generating in the memory, using the processor, an encrypted representation of a classification corresponding to the input vector based on the encrypted representation of the identities of the k-nearest neighbors to the input vector; and transmitting the encrypted representation of the classification through the network interface and over the computer network to the user device, wherein the user device is operative to decrypt the transmitted encrypted representation of the classification to provide a classification of the encrypted input vector at the user device.

9. The computer implemented process of claim 8, wherein sorting comprises homomorphically computing a minimum operation k times.

10. The computer implemented process of claim 9, wherein the server computer and the user device create a permutation of a classification vector, mapping identities of the plurality of stored vectors to classification information.

11. The computer implemented process of claim 8, wherein sorting includes computing a bit decomposition of each comparison result.

12. The computer implemented process of claim 11, wherein sorting comprises homomorphically computing a computational circuit using the bit decompositions of the comparison results.

13. The computer implemented process of claim 8, wherein sorting includes blinding encrypted comparison results and transmitting the blinded encrypted comparison results to the user device.

14. The computer implemented process of claim 13, wherein sorting includes receiving a selection vector including blinded results identifying k-nearest neighbors from the user device, and applying the selection vector to a classification vector.

15. An article of manufacture comprising:
computer storage having computer program instructions stored in the computer storage, that, when executed by a computer having a processor, memory connected to the processor to allow access by the processor to data stored in the memory, and persistent storage connected to the processor to allow access by the processor to data stored in the persistent storage and a network interface connected to the processor and the memory to allow access by the computer to a computer network and communicate messages over the computer network, wherein the computer program instructions, when processed by the processor, instruct the processor to perform a process comprising:

store, in the memory, an encrypted input vector received from a user device over the computer network and through the network interface, wherein the input vector is encrypted using a public key related to the user device;

homomorphically compute, using the processor, encrypted distances between the received encrypted input vector and each of a plurality of stored vectors;

sort the computed encrypted distances in communication with the user device such that the user device sends the server computer an encrypted representation of identities of k-nearest neighbors to the input vector from among the plurality of stored vectors;

generate in the memory, using the processor, an encrypted representation of a classification corresponding to the input vector based on the encrypted representation of the identities of the k-nearest neighbors to the input vector; and transmit the encrypted representation of the classification through the network interface and over the computer network to the user device, wherein the user device is operative to decrypt the transmitted encrypted representation of the classification to provide a classification of the encrypted input vector at the user device.

16. The article of manufacture of claim 15, wherein sorting comprises homomorphically computing a minimum operation k times.

17. The article of manufacture of claim 16, wherein the server computer and the user device create a permutation of a classification vector, mapping identities of the plurality of stored vectors to classification information.

18. The article of manufacture of claim 15, wherein sorting includes computing a bit decomposition of each comparison result.

19. The article of manufacture of claim 18, wherein sorting comprises homomorphically computing a computational circuit using the bit decompositions of the comparison results.

20. The article of manufacture of claim 15, wherein sorting includes blinding the encrypted comparison results and transmitting the blinded encrypted comparison results to the user device.

* * * * *